United States Patent Office 3,427,236
Patented Feb. 11, 1969

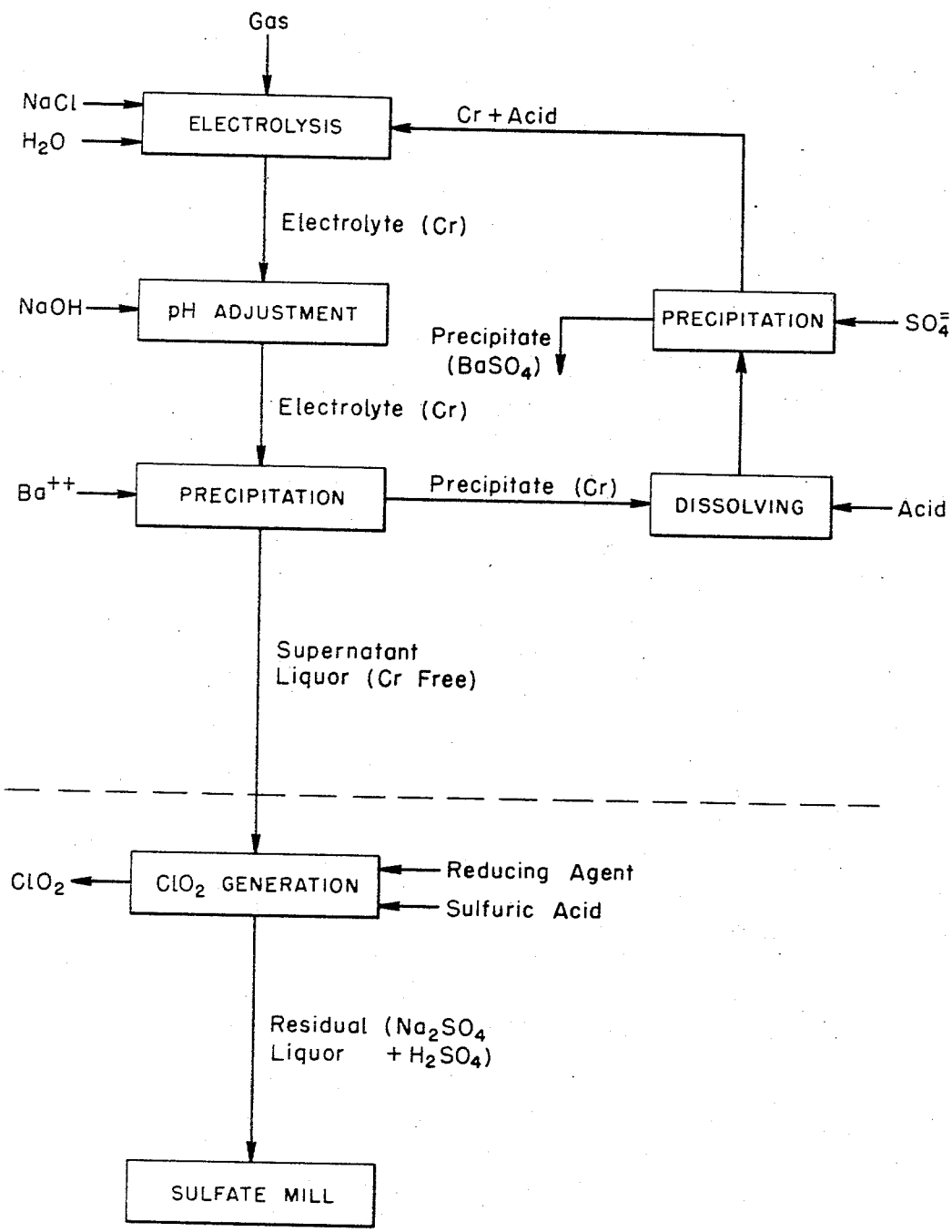

3,427,236
PROCESS FOR THE PREPARATION OF AN ALKALI METAL CHLORATE SOLUTION FOR USE IN A CHLORINE DIOXIDE GENERATION PROCESS
Axel Fredrik Scholander, Ornskoldsvik, and Rolf Karl August Brännland, Alfredshem, Sweden, assignors to Mo Och Domsjo Aktiebolag, Ornskoldsvik, Sweden, a limited company of Sweden
Filed Mar. 14, 1966, Ser. No. 533,892
Claims priority, application Sweden, Mar. 16, 1965, 3,428/65
U.S. Cl. 204—95          11 Claims
Int. Cl. C01b *11/14*

The present invention relates to the preparation of alkali metal chlorate solutions for use in a process for generating chlorine dioxide, the spent liquor from which can be used in alkali metal based digestion process for lignocellulosic material.

In the electrolytic preparation of chlorate solutions which are to be used for generating chlorine dioxide, chromium salts are added to improve the current yield of the method. The chromium salts which are relatively expensive, are recirculated together with the mother liquor of the crystallization process to the electrolysis system.

From an economical point of view it is desirable that the spent chlorate solutions which contain inter alia large amounts of alkali metal (sodium) salts, be used to cover chemical losses, e.g. in sodium-based pulping processes for lignocellulosic materials. However, the chromate content prevents such use, firstly, because the economical value of the chromate in the solution is relatively high, and secondly, because in such use the chromate will be accumulated in the chemical recovery system (the white liquor system) of the pulping plant and cause undesirable side reactions with the lignin in the pulping operation.

The main object of the present invention is to provide a process for the preparation of alkali metal chlorate solutions, which after use for generating chlorine dioxide can advantageously be used in alkali metal based digestion or pulping processes for lignocellulosic materials, e.g. the sulfate or sulfite process, the chromate being returned to the electrolytic process as a solution, which can also be used for the acidification required for the electrolysis of the chlorate.

Other objects and advantages of the invention will become apparent from the following description taken in conjunction with the accompanying drawing wherein FIGURE 1 shows a flow sheet of the process.

The present invention provides a process for the above purpose, in which a chromium containing alkali metal chlorate solution, obtained by electrolysis of an alkali metal chloride solution in the presence of chormium salts, has the pH adjusted to such a value that the principal part of the chromium is in the form of chromate ions ($CrO_4^{2-}$), the chromate ions are precipitated by addition of cations forming slightly soluble chromates, which are separated from the chlorate solution, the slightly soluble chromate is dissolved in hydrochloric acid or sulfuric acid, the precipitate-forming cations present in the resulting acid solution are precipitated as slightly soluble salts and are separated and the residual chromium-containing solution is returned to the electrolysis step and the chlorate solution thus obtained without intermediate crystallization is used in a chlorine dioxide generation process in which the chlorate ions are reduced to chlorine dioxide and the alkali metal ions remaining in the solution are used for chemical make-up in the digestion of lignocellulosic materials.

The chlorate solution leaving the electrolysis step has generally the following composition, when graphite anodes are used for the electrolysis:

|  | G./l. |
|---|---|
| $NaClO_3$ | 500–650 |
| $NaCl$ | 75–150 |
| Chromium compounds as $Na_2Cr_2O_7 \cdot 2H_2O$ | 2.4 |

The first step of the present process comprises adjusting pH of said solution to a value above 3, preferably 7 to 8, by adding alkali, e.g. sodium hydroxide or sodium bicarbonate to convert the chromium compounds therein into chromate. To precipitate the chromate as a slightly soluble chromium compound a, salt is then added which forms a slightly soluble compound with said chromate. Suitable salts are chlorides, carbonates or hydroxides of barium and lead, and the salt is to be added in an amount such that the chromium is practically completely precipitated from the solution (stoichiometric amount). The precipitated slightly soluble chromate is separated from the solution, e.g. by decantation or filtering, resulting in a clear colorless solution free from chromate and containing only chlorate and chloride. This solution may without further treatment be used in the chlorine dioxide generating step and then advantageously be supplied to the pulping liquor system in the cellulose pulping process to serve as a source of make-up chemicals to cover the alkali losses.

The separated chromate precipitate contains mainly chromate, but also graphite or iron sludge, inter alia from the electrode material. This chromate precipitate was found to be readily soluble in highly acidic liquids. According to this invention, the chromate precipitate is preferably dissolved in hydrochloric acid or sulfuric acid, the acid concentration in the solution being maintained at 0.01 to 10.0 equivalents of acid per liter, preferably 0.1 to 2.0 equivalents of acid per liter. The use of hydrochloric acid for this dissolution step has the advantage that the same acid is used both for dissolving the chromate and for adjusting the pH in the electrolysis step. Thus, a portion of the acid required for the last mentioned purpose can be supplied with the recirculated chromate solution, at the same time as an addition of the anion used in the electrolysis operation is obtained. Hydrochloric acid of 2% strength was found particularly suitable for this purpose with respect to the rate of dissolution and the requirement for acid to adjust the pH in the electrolysis step. Other strong acids, such as sulfuric acid and phosphoric acid, can be used to dissolve the chromate sludge, but in such a case the new anion introduced into the system has to be taken into consideration.

However, the resulting acidic chromate solution still contains ions, such as barium or lead ions, which would again form slightly soluble chromate when the pH is increased. Thus, these precipitate-forming anions have to be removed, which is achieved by precipitating them as slightly soluble salts and then separating these salts by decantation of filtration. Suitable precipitating agents are, e.g., soluble sulfates and phosphates, such as sodium sulfate and monosodium dihydrogen phosphate. The solution from which the precipitate has been removed, is then returned to the electrolysis system.

The conversion of the chromate salt into sulfate salt can also take place in one step by treating the chromate precipitate with dilute sulfuric acid. It was found by practical experiments, however, that this procedure is somewhat slower than the method described above, comprising dissolving the chromate and precipitating sulfate in two separate steps.

When sulfuric acid is used as the acidifying and precipitating agent, it may sometimes be necessary to add so great an amount of acid that an excess of sulfate ions is present in the solution. In such a case, the excess may be eliminated by a corresponding extra addition of barium or lead ions. Generally, however, the concentration and pH conditions in the sludge suspension are such that dissolution can be carried out with the stoichiometric amount of sulfuric acid required to convert the chromate precipitate in sulfate.

The precipitation of the chromate is suitably carried out at the temperature prevailing in the chlorate solution after completion of the electrolysis, i.e. 40 to 50° C., but may also be carried out at a lower temperature; the latter procedure, however, results in a more finely-divided precipitate which does not settle readily.

The dissolution of the slightly soluble chromate is suitably carried out at elevated temperature, since the rate of dissolution is increased thereby. For economical reasons, however, it is not desirable to increase the temperature above 60 to 70° C. In particular, when treating the chromate sludge with sulfuric acid, where the solid phases, barium chromate and barium sulfate, are present together, it was found suitable to operate at an elevated temperature.

The above described general process is illustrated by the flow sheet on the accompanying drawing.

This invention is illustrated but not limited by the following examples.

Example 1

50 cubic meters of aqueous salt solution from chlorate electrolysis and containing 600 g./l. of $NaClO_3$, 100 g./l. of NaCl and 3 g./l. of chromate (calculated as $Na_2Cr_2O_7 \cdot 2H_2O$)

was neutralized in a vessel having a conical bottom (60° cone angle) to pH 7 with 400 liters of 40% aqueous caustic soda solution. Thereupon, 1400 liters of aqueous barium chloride containing 200 g./l. of $BaCl_2 \cdot 2H_2O$ was added. The solution was agitated with compressed air, in an amount of 100 m.³/h., which was introduced through a perforated tube disposed in the lower portion of the conical bottom. The mixture was allowed to settle for 15 hours, whereupon the clear supernatant solution was withdrawn through an outlet in the top portion of the conical bottom, and was transferred to a chlorine dioxide generator. Therein, sulfuric acid was added, and the solution was reduced with sulfur dioxide to form chlorine dioxide and sodium sulfate. The sulfuric acid sodium sulfate solution was used in the resin boilers of the sulfate pulping plant to decompose saponified substances, whereupon the remaining solution was mixed with sulfate pulping spent liquor (black liquor), which was burnt in a recovery furnace to form chemicals to be used for preparing fresh pulping liquor (white liquor).

The sludge resulting from the chromate precipitation was suspended in 15 cubic meters of water at room temperature, and the mixture was acidified with 900 liters of 30% aqueous hydrochloric acid. After agitation with compressed air for 2 hours, a clear solution was obtained, to which 2400 liters of aqueous sodium sulfate, containing 150 g./l. of $Na_2SO_4 \cdot 10H_2O$, was added. This resulted in the formation of a precipitate which was allowed to settle for 4 hours, whereupon the clear solution was withdrawn through the outlet in the top portion of the conical bottom, and returned to the electrolysis system, where it was supplied continously for adjusting the pH, while at the same time the requisite concentration of chromate was maintained.

The sulfate sludge was washed with 15 cubic meters of water, and then allowed to settle for a further 4 hours, whereupon the washing water was withdrawn through the outlet referred to above, and transferred to the electrolysis system to replace part of the water removed as chlorate solution. The sulfate sludge was discharged as a waste produce.

Example 2

50 cubic meters of aqueous salt solution derived from chlorate electrolyzers and containing 600 g./l. of $NaClO_3$, 100 g./l. of NaCl and 3 g./l. of chromate (as $Na_2Cr_2O_7 \cdot 2H_2O$)

was neutralized in a vessel having a conical bottom to pH 4 with 1100 liters of aqueous soda solution containing 170 g./l. of $Na_2CO_3$. Thereupon, 1400 liters of an aqueous suspension of 200 g./l. lead carbonate was added. The solution was mixed by the aid of a mechanical agitator for 2 hours. The mixture was allowed to settle for 13 hours, whereupon the clear solution was withdrawn by means of a siphon, where was progressively lowered in the vessel as the surface level of the solution sank. The chlorate solution, free of chromate, was transferred to a chlorine dioxide generator, and reduced in the manner described above to sulfate. The acidic residual liquor was introduced, without neutralization, into the chemical recovery system of a sulfite pulping plant operating with sodium base liquor, and was burnt in its recovery furnace to form chemicals useful for preparing fresh pulping acid (sulfite liquor).

The sludge from the precipitation of chromate was suspended in 15 cubic meters of water, 500 liters of 20% aqueous sulfuric acid was added, and the mixture heated by injection of steam to 70° C. After mixing for 2 hours, the precipitate was allowed to settle for 4 hours. The clear solution was drawn off through the siphon, and returned to the electrolysis system as described in Example 1.

The sulfate sludge was washed with 15 cubic meters of water, and then allowed to settle for 4 hours, whereupon the washing water was drawn off and also sent to the electrolysis system. The sulfate sludge was discharged to waste.

Having regard to the forgoing disclosure, the following is claimed as the inventive and patentable embodiments thereof:

1. A process for the preparation of an alkali metal chlorate solution comprising electrolyzing an alkali metal chloride solution in the presence of chromium salts to produce an alkali metal chlorate solution, adjusting the pH to such a value that the principal part of the chromium is in the form of chromate ions, precipitating the chromate ions by addition of cations forming slightly soluble chromates, separating a precipitate of the slightly soluble chromates from the chlorate solution, dissolving the chromate precipitate in hydrochloric acid or sulfuric acid, precipitating the cations from the resulting acid solution as slightly soluble salts, and returning the residual chromium-containing solution to the electrolysis step.

2. Process according to claim 1, wherein the pH value of the chromium containing chlorate solution is adjusted to a value higher than 3 by addition of alkali, and the chromate is precipitated as a slightly soluble barium or lead chromate.

3. Process according to claim 2, wherein barium or lead chloride is added.

4. Process according to claim 1, wherein the acid concentration at the dissolution of the slightly soluble chromate is 0.01–10 gram equivalents per liter.

5. Process according to claim 1, wherein the slightly soluble chromate is dissolved in hydrochloric acid and the precipitate-forming cations are precipitated by the addition of a soluble sulfate.

6. Process according to claim 1, wherein the slightly soluble chromate is dissolved in sulfuric acid with direct formation of insoluble sulfate and any excess of sulfate ions is precipitated by addition of the necessary amount of precipitate-forming cations.

7. Process according to claim 1, wherein the precipitation of slightly soluble chromate is performed at a temperature of 20–50° C.

8. Process according to claim 1, where in the dissolution of the slightly soluble chromate is performed at a temperature of 40–70°C.

9. Process according to claim 2 wherein the pH value of the chromium containing chlorate solution is adjusted to a value of between 7 and 8.

10. Process according to claim 4 wherein the acid concentration is between 0.1 to 2 gram equivalents per liter.

11. A process for preparing chlorine dioxide from alkali metal chloride comprising electrolyzing alkali metal chloride to chlorate in the presence of chromium salt, adjusting the pH of the electrolyte after the electrolysis to a value above 3 to convert the chromium ion to chromate, precipitating the chromate by adding a cation forming a slightly soluble chromate, separating a precipitate of the slightly soluble chromate, dissolving the chromate precipitate in an aqueous acid solution, precipitating the cation by adding an anion forming a slightly soluble salt of the chromate precipitating ion, separating a precipitate of the slightly soluble salt thus formed, recycling the chromium containing solution to the electrolysis step, and converting the chlorate in the residual solution to chlorine dioxide without intermediate separation of solid chlorate.

References Cited
UNITED STATES PATENTS

| | | | |
|---|---|---|---|
| 1,143,586 | 6/1915 | Laib | 204—95 |
| 2,484,402 | 10/1949 | Day et al. | 23—152 |
| 2,489,574 | 11/1949 | Hampel | 23—85 |

FOREIGN PATENTS

| | | |
|---|---|---|
| 17,320 | 1901 | Great Britain. |

JOHN H. MACK, *Primary Examiner.*

D. R. JORDAN, *Assistant Examiner.*

U.S. Cl. X.R.

204—82; 23—152